(12) United States Patent
Zhang et al.

(10) Patent No.: US 11,634,332 B2
(45) Date of Patent: Apr. 25, 2023

(54) SELENIUM-DOPED MXENE COMPOSITE NANO-MATERIAL, AND PREPARATION METHOD AND USE THEREOF

(71) Applicant: WUYI UNIVERSITY, Guangdong (CN)

(72) Inventors: Yelong Zhang, Guangdong (CN); Xiaodan Xu, Guangdong (CN); Hongyang Sun, Guangdong (CN); Chengwei Liu, Guangdong (CN); Chi Zhang, Guangdong (CN); Da Wang, Guangdong (CN); Weidong Song, Guangdong (CN); Jinxiu Wen, Guangdong (CN); Yue Guo, Guangdong (CN); Zheng Liu, Guangdong (CN); Mei Chen, Guangdong (CN); Qingguang Zeng, Guangdong (CN); Zhangquan Peng, Guangdong (CN)

(73) Assignee: WUYI UNIVERSITY, Jiangmen (CN)

( * ) Notice: Subject to any disclaimer, the term of this patent is extended or adjusted under 35 U.S.C. 154(b) by 904 days.

(21) Appl. No.: 16/529,104

(22) Filed: Aug. 1, 2019

(65) Prior Publication Data
US 2020/0223702 A1  Jul. 16, 2020

(30) Foreign Application Priority Data

Jan. 16, 2019 (CN) .......................... 201910038413.1

(51) Int. Cl.
*C01B 32/921* (2017.01)
*H01M 4/36* (2006.01)
(Continued)

(52) U.S. Cl.
CPC .......... *C01B 32/921* (2017.08); *C01B 32/949* (2017.08); *H01M 4/362* (2013.01);
(Continued)

(58) Field of Classification Search
CPC ... C01B 32/914; C01B 32/921; C01B 32/949; H01M 4/362; H01M 4/58; H01M 4/583; C01P 2002/54
See application file for complete search history.

(56) References Cited

FOREIGN PATENT DOCUMENTS

| CN | 106025200 | * 10/2016 |
| CN | 106025200 A | 10/2016 |

(Continued)

OTHER PUBLICATIONS

First Office Action issued to Chinese counterpart Application No. 201910038413.1 dated Mar. 25, 2021.
(Continued)

*Primary Examiner* — Brittany L Raymond
(74) *Attorney, Agent, or Firm* — McNees Wallace & Nurick LLC (57) ABSTRACT

The present invention discloses a selenium-doped MXene composite nano-material and a preparation method thereof, comprising the following steps: (1) adding MXene and an organic selenium source into a dispersant, and stirring to prepare a dispersion with a concentration of 1 mg/ml to 100 mg/ml; (2) transferring the dispersion into a reaction kettle, then heating, reacting, and then naturally cooling to a room temperature; (3) washing the product obtained in the step (2) with a cleaning agent, then centrifuging to collect a precipitate, and drying the precipitate under vacuum; and (4) placing the sample obtained in the step (3) into a tubular furnace for calcination, introducing protective gas, heating, and then cooling to a room temperature to obtain the selenium-doped MXene composite nano-material. The material prepared by the present invention has high specific surface area, good electrical conductivity, cycle stability performance, rate performance and high theoretical specific capacity.

12 Claims, 6 Drawing Sheets

(51) Int. Cl.
  *H01M 4/583*  (2010.01)
  *C01B 32/949* (2017.01)
  *B82Y 40/00*  (2011.01)
  *B82Y 30/00*  (2011.01)

(52) U.S. Cl.
  CPC ............ *H01M 4/583* (2013.01); *B82Y 30/00* (2013.01); *B82Y 40/00* (2013.01); *C01P 2002/20* (2013.01); *C01P 2002/54* (2013.01)

(56) References Cited

FOREIGN PATENT DOCUMENTS

| CN | 107170587 A |   | 9/2017 |
|----|-------------|---|--------|
| CN | 108516528   | * | 9/2018 |
| CN | 108516528 A |   | 9/2018 |

OTHER PUBLICATIONS

First Search Report issued to Chinese counterpart Application No. 201910038413.1 dated Jan. 16, 2019.
Second Office Action issued to Chinese counterpart Application No. 201910038413.1 dated Aug. 4, 2021.
Tang et al. "Synthesis of Nitrogen-Doped Two-Dimensional Ti3C2 with Enhanced Electrochemical Performance", Journal of the Electrochemical Society, 164, 4, A923-A929, 2017.

* cited by examiner

SELENIUM-DOPED MXENE COMPOSITE NANO-MATERIAL, AND PREPARATION METHOD AND USE THEREOF

FIELD OF THE INVENTION

The present invention belongs to the field of nano-material technologies, and relates to a selenium-doped MXene composite nano-material, and a preparation method and a use thereof, and more particularly, to a use as an electrode material in a potassium ion battery.

BACKGROUND OF THE INVENTION

Two-dimensional (2D) materials, typified by graphene, have many excellent properties due to their high specific surface area, because they shorten paths of ion and electron movements, and large exposed surface area provides rich insertion channels. Especially, the graphene, a typical two-dimensional $sp^2$ hybrid carbon plate, has been widely used in energy conversion and storage in the past ten years due to its high electrical conductivity and buffering characteristic to reduce structural changes during cycling. The graphene is widely used in many fields, such as energy storage, catalysis and chemical sensors.

In recent years, the discovery of MXene, a new two-dimensional material, has added many new members to the two-dimensional material family. MXenes are a new series of two-dimensional metal carbides and carbonitrides, which stand out because of unique physical and chemical properties. Generally, the novel material can be obtained by selective chemical etching, and hydrofluoric acid is used to delaminate an A layer from a layered $M_{n+1}AX_n$ phase, wherein M is an early transition metal, A is IIIA family or IVA family, and X is C and/or N. Etching is performed to form a $M_{n+1}X_n$ layer with a nano-scale thickness, and functional groups containing hydroxyl, oxygen and fluorine are used for termination. A nano-plate has a nano-scale thickness, rich chemical components and rich functional groups that endow MXenes with excellent hydrophilic surfaces, rich chemical properties and adjustable physical and chemical properties without sacrificing the metal conductivity, which is rarely reported in traditional two-dimensional materials such as graphene, nitride, layered transition metal disulfide and dual materials.

At present, lithium ion batteries have been widely used in people's daily life, and the large consumption of metal lithium has also been concerned by people. Therefore, to seek a substitute for the lithium ion battery has become a current research focus.

In addition, $H_2S$ is used as a sulfur source in a widely used sulfur-doped MXene technology, which has high toxicity and high pollution, and is difficult to process subsequently. Therefore, it is of great practical significance to prepare the selenium-doped MXene composite nano-material and the potassium ion battery with low cost, safety and environmental protection through a simple method.

SUMMARY OF THE INVENTION

In view of the problems in the prior art, one object of the present invention is to provide a selenium-doped MXene composite nano-material. Another object of the present invention is to provide a preparation method of the selenium-doped MXene composite nano-material mentioned above. Further, the present invention provides an application of the selenium-doped MXene composite nano-material to use the selenium-doped MXene composite nano-material in a cathode of a potassium ion battery.

The present invention employs the following technical solutions.

A preparation method of a selenium-doped MXene composite nano-material, comprising the following steps:

(1) adding MXene and an organic selenium source into a dispersant, stirring to prepare a dispersion with a concentration of 1 mg/ml to 100 mg/ml, optionally a concentration of 10 mg/ml to 90 mg/ml, optionally a concentration of 20 mg/ml to 80 mg/ml, and optionally a concentration of 40 mg/ml to 60 mg/ml, wherein a mass ratio of MXene and an organic selenium source is 1:1 to 10, optionally 1:2 to 8 and optionally 1:4 to 6;

(2) transferring the dispersion into a reaction kettle, then heating to 100° C. to 220° C., reacting for 10 h to 30 h, wherein the reaction is preferably performed in the reaction kettle (the reaction kettle is sealed), and then naturally cooling to a room temperature;

(3) washing the product obtained in the step (2) with a cleaning agent, then centrifuging to collect a precipitate, and drying the precipitate under vacuum for 6 h to 20 h, for example, 12 h; and (4) placing the sample obtained in the step (3) into a tubular furnace for calcination, introducing protective gas, heating to 300° C. to 1000° C. (for example, 400° C., 500° C., 600° C., 700° C., 80° C., 900° C. and 1000° C.) at a temperature rise rate of 3° C. /min to 7° C. /min (for example, 4° C./min, 5° C./min and 6° C./min) for 2 h to 8 h (for example, 2 h, 3 h, 4 h, 5 h, 6 h, 7 h and 8 h), and then naturally cooling to a room temperature to obtain the selenium-doped MXene composite nano-material.

Further, the organic selenium source is at least one selected from the group consisting of phenylselenol, dimethyl selenide and dibenzyl diselenide, preferably phenylselenol, and preferably phenylselenol, dimethyl selenide and dibenzyl diselenide with a mass ratio of 3-8:1:1-3.

Further, the MXene is one or more selected from the group consisting of $Ti_2NT_x$, $Mo_2NT_x$, $V_2NT_x$, $Ti_2CT_x$, $Mo_2CT_x$ and $V_2CT_x$, optionally $V_2CT_x$, optionally $Mo_2NT_x$, optionally $V_2NT_x$, and optionally $Ti_2CT_x$ and $Mo_2CT_x$ with a mass ratio of 4 to 6:1, and optionally $Ti_2CT_x$, $Mo_2CT_x$ and $V_2CT_x$ (e.g., a mass ratio of 5-8:2:1), wherein $T_x$ is a surface functional group, such as —O, —F or —OH.

Further, the dispersant is at least one selected from the group consisting of N,N-dimethylformamide and ethanol.

Further, the cleaning agent is at least one selected from the group consisting of water and ethanol. Preferably, the precipitate is thoroughly washed with deionized water and absolute ethyl alcohol, and the precipitate can be alternately washed with deionized water and absolute ethyl alcohol for 2 to 15 times, and preferably 3 to 8 times.

Further, a selenium doping amount in the selenium-doped MXene composite nano-material is 3 to 8 wt % (for example, 3 wt %, 4 wt %, 5 wt %, 6 wt %, 7 wt % and 8 wt %).

Further, a stirring time in the step (1) is 1 h to 5 h, and optionally 2 h, 3 h, 4 h and 5 h.

Further, the dispersion is heated to 110° C. to 200° C., preferably 130° C. to 180° C., and optionally 140° C., 150° C., 160° C. and 170° C., and reacted for 10 h to 30 h, and optionally 11 h, 12 h, 13 h, 14h, 15 h, 16 h, 17 h, 18 h, 19 h, 20 h, 21 h, 22 h, 23 h, 24 h, 25 h, 26 h, 27 h and 28 h in the reaction kettle in the step (2).

Further, the protective gas is $N_2$ or Ar, and a gas flow speed is 180 ml/min to 300 ml/min, for example, 180 ml/min, 190 ml/min, 200 ml/min, 210 ml/min, 220 ml/min, 230 ml/min, 240 ml/min, 250 ml/min, 260 ml/min, 270 ml/min, 280 ml/min, 290 ml/min and 300 ml/min.

Further, a rotation speed used for the centrifugation in the step (3) is 4000 rpm to 6000 rpm, and preferably 5000 rpm.

Further, a temperature of drying under vacuum is 50° C. to 70° C., and preferably 60° C., and a vacuum degree does not exceed 133 Pa, for example, the vacuum degree does not exceed 125 Pa, 115 Pa, 105 Pa, 95 Pa and 85 Pa.

There is also provided a selenium-doped MXene composite nano-material prepared by the preparation method of a selenium-doped MXene composite nano-material.

There is also provided a use of the selenium-doped MXene composite nano-material, wherein the selenium-doped MXene composite nano-material is used in a cathode of a potassium ion battery.

The MXene material does not contain precious metals, and has the advantages of low cost of raw materials, excellent electronic conductivity, stable structure, high specific surface area, good cycle stability, etc. However, the performances of the MXene material are affected due to small interlamellar spacing and surface adsorption of groups such as —F/—OH, etc. After being doped with selenium, some C and N atoms in the MXene are replaced by Se atoms, and the surface of the MXene has a large number of structural defects, thus causing more electrochemically active sites, enabling electrolyte ions to migrate rapidly between layers, and greatly improving the performance in specific capacity, rate performance, cycle stability, high-efficiency energy storage and conversion applications.

According to the present invention, the selenium-doped MXene two-dimensional layered composite nano-material with better crystal form, good stability and uniform appearance is obtained by controlling different components and ratios between the MXene material and the selenium source as well as the reaction temperature and time.

The present invention has the following beneficial effects:
(1) the selenium-doped MXene composite nano-material prepared by the present invention has high specific surface area, good electrical conductivity, cycle stability performance, rate performance and high theoretical specific capacity, and is simple in preparation and has a low cost, and is suitable for large-scale development and application of potassium ion batteries; and
(2) the present invention has mature preparation apparatus, simple process, easily available raw materials and high production efficiency, and is convenient for large-scale industrial production and application.

DETAILED DESCRIPTION OF THE INVENTION

In order to better explain the invention, the invention will be further described with reference to the following specific embodiments, but the present invention is not limited to the specific embodiments.

Embodiment 1

A preparation method of a selenium-doped MXene composite nano-material, comprised the following steps:
(1) 40 mg MXene material ($Ti_2CT_x$) and 40 mg phenylselenol were added into ethanol to prepare 1 mg/ml dispersion, and the dispersion was magnetically stirred at a room temperature for 1 h;
(2) the dispersion obtained in the step (1) was transferred into a 100 ml reaction kettle, placed in an oven to react at 100° C. for 10 h, and naturally cooled to a room temperature;
(3) the product obtained in the step (2) was collected, thoroughly cleaned with deionized water and anhydrous ethanol, and centrifuged, and then dried under vacuum at 60° C. for 6 h;
(4) the sample obtained in the step (3) was placed into a tubular furnace for calcination, introduced with Ar gas at a gas flow speed of 180 ml/min, and a temperature rise rate of 5° C./min, further calcined at 300° C. for 2 h, and then naturally cooled to a room temperature to finally obtain the selenium-doped MXene composite nano-material; and
(5) the selenium-doped MXene composite nano-material obtained in the step (4) was mixed with a polyvinylidene fluoride binder and carbon black according to a mass ratio of 8:1:1, a proper amount of N-methyl pyrrolidone solution was added, stirred and dispersed, a slurry was formed after uniformly stirring and was coated on a current collector, and dried under vacuum and sliced as an electrode material.

Figure 1:
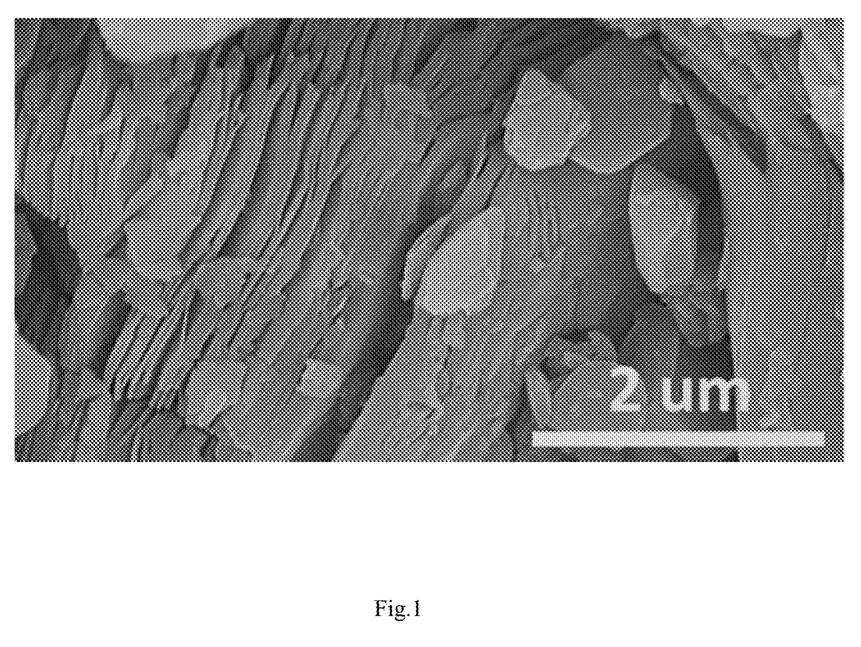
FIG. 1 is a scanning electron micrograph of an undoped MXene material in a Comparative Example 1.
Figure 2:
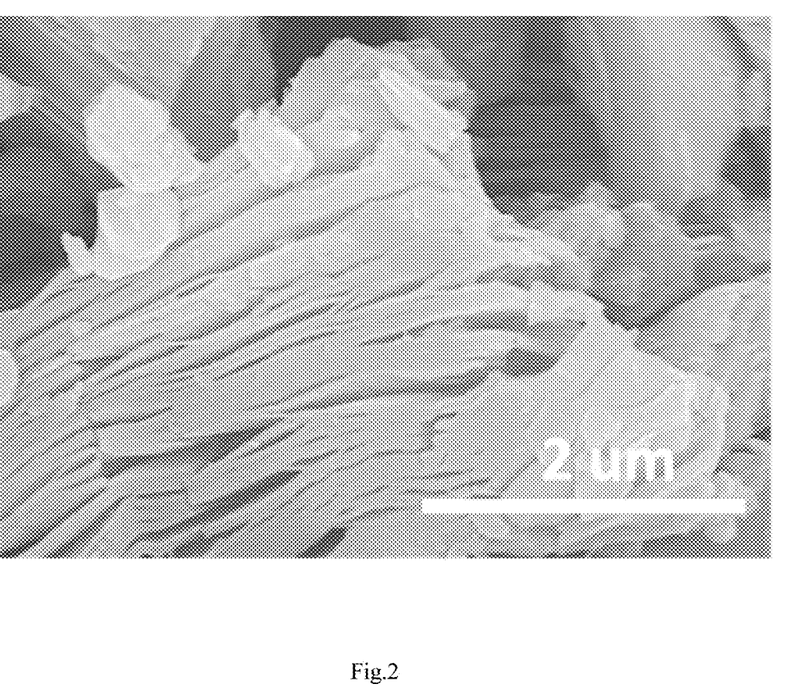
FIG. 2 is a scanning electron micrograph of a selenium-doped MXene composite nano-material in Embodiment 1.
Figure 3:
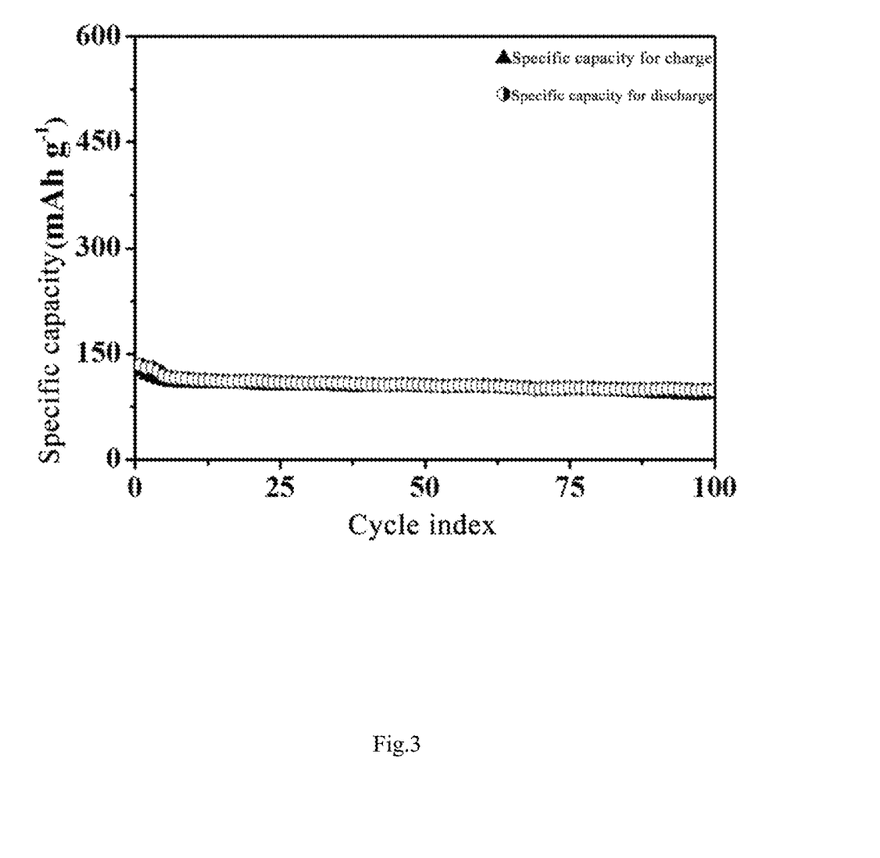
FIG. 3 is a cycle performance chart of a cathode of an undoped MXene potassium ion battery in Comparative Example 1.
Figure 4:
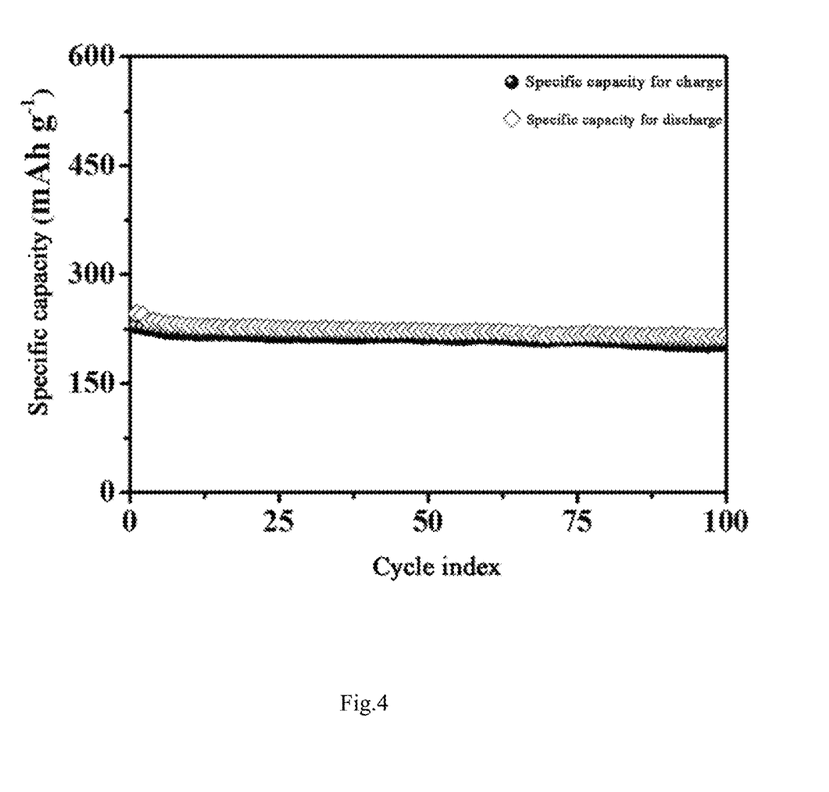
FIG. 4 is a cycle performance chart of a cathode of a selenium-doped MXene potassium ion battery in Embodiment 1.

The doped MXene in this embodiment had a specific surface area of 185.7 $m^2/g$, an interlamellar spacing of 0.73 nm, and a selenium atom content of 3%, which were much larger than a specific surface area (42.3 $m^2/g$) and an interlamellar spacing (0.61 nm) of the undoped MXene. At a current density of 100 mA/g, a reversible capacity of the selenium-doped MXene as an electrode material shown in FIG. 4 after 100 cycles was 220.5 mAh/g, which was 2.43 times that of an undoped MXene as an electrode shown in FIG. 3 (90.7 mAh/g).

Embodiment 2

A preparation method of a selenium-doped MXene composite nano-material, comprised the following steps:
(1) 200 mg MXene material ($Ti_2CT_x$) and 1000 mg phenylselenol were added into an ethanol solution to prepare 50 mg/ml dispersion, and the dispersion was magnetically stirred at a room temperature for 3 h;
(2) the dispersion obtained in the step (1) was transferred into a 50 ml reaction kettle, placed in an oven to react at 160° C. for 20 h, and naturally cooled to a room temperature;
(3) the product obtained in the step (2) was collected, thoroughly cleaned with deionized water and anhydrous ethanol, and centrifuged, and then dried under vacuum at 60° C. for 12 h;

(4) the sample obtained in the step (3) was placed into a tubular furnace for calcination, introduced with Ar gas at a gas flow speed of 220 ml/min, and a temperature rise rate of 5° C./min, further calcined at 600° C. for 5 h, and then naturally cooled to a room temperature to obtain the selenium-doped MXene composite nano-material; and (5) the selenium-doped MXene composite nano-material obtained in the step (4) was mixed with a polyvinylidene fluoride binder and carbon black according to a mass ratio of 8:1:1, a proper amount of N-methyl pyrrolidone solution was added, stirred and dispersed, a slurry was formed after uniformly stirring and was coated on a current collector, and dried under vacuum and sliced as an electrode material.

Figure 5:
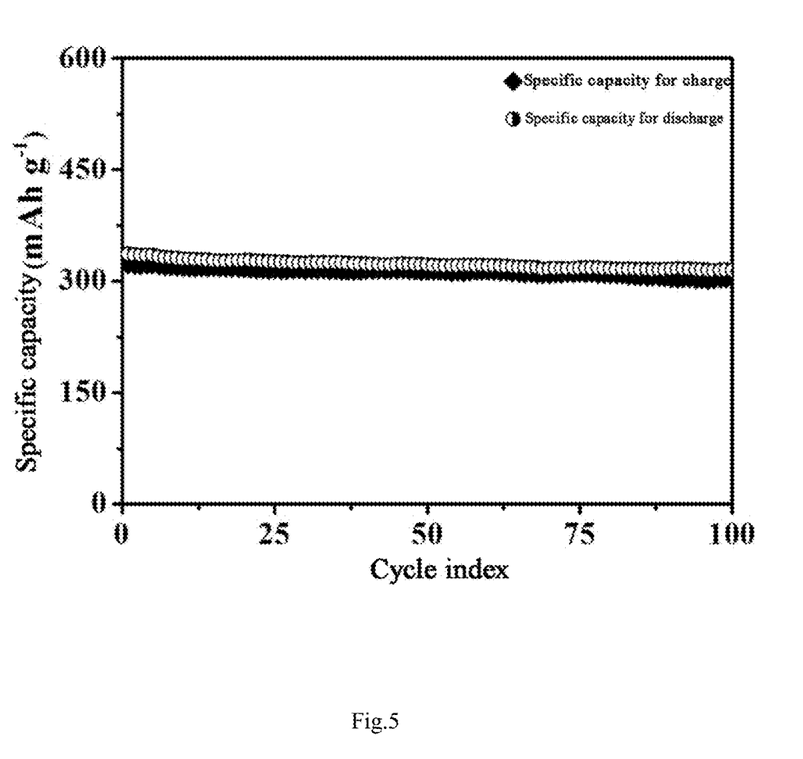
FIG. 5 is a cycle performance chart of a cathode of a selenium-doped MXene potassium ion battery in Embodiment 2.

The selenium-doped MXene in this embodiment had a specific surface area of 326.2 $m^2/g$, an interlamellar spacing of 0.77 nm, and a selenium atom content of 6%, which were much larger than the specific surface area (42.3 $m^2/g$) and the interlamellar spacing (0.61 nm) of the undoped MXene. At a current density of 100 mA/g, a reversible capacity of the selenium-doped MXene as an electrode material shown in FIG. 5 after 100 cycles was 321 mAh/g, which was 3.54 times that of the undoped MXene as an electrode (90.7 mAh/g).

Embodiment 3

A preparation method of a selenium-doped MXene composite nano-material, comprised the following steps:
(1) 500 mg MXene material ($Ti_2CT_x$) and 5000 mg phenylselenol were added into ethanol to prepare 100 mg/ml dispersion, and the dispersion was magnetically stirred at a room temperature for 5 h;
(2) the dispersion obtained in the step (1) was transferred into a 100 ml reaction kettle, placed in an oven to react at 220° C. for 30 h, and naturally cooled to a room temperature;
(3) the product obtained in the step (2) was collected, thoroughly cleaned with deionized water and anhydrous ethanol, and centrifuged, and then dried under vacuum at 60° C. for 20 h;
(4) the sample obtained in the step (3) was placed into a tubular furnace for calcination, introduced with Ar gas at a gas flow speed of 300 ml/min, and a temperature rise rate of 5° C./min, further calcined at 1000° C. for 8 h, and then naturally cooled to a room temperature to finally obtain the selenium-doped MXene composite nano-material; and
(5) the selenium-doped MXene composite nano-material obtained in the step (4) was mixed with a polyvinylidene fluoride binder and carbon black according to a mass ratio of 8:1:1, a proper amount of N-methyl pyrrolidone solution was added, stirred and dispersed, a slurry was formed after uniformly stirring and was coated on a current collector, and dried under vacuum and sliced as an electrode material.

Figure 6:
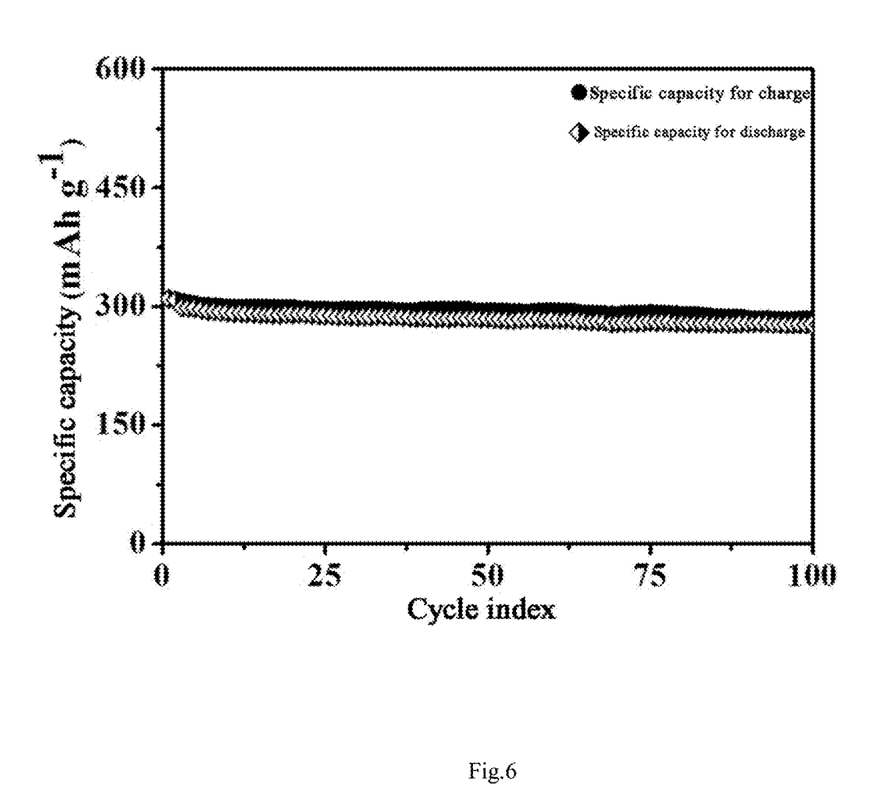
FIG. 6 is a cycle performance chart of a cathode of a selenium-doped MXene potassium ion battery in Embodiment 3.

The selenium-doped MXene in this embodiment has a specific surface area of 283.9 $m^2/g$, an interlamellar spacing of 0.76 nm, and a selenium atom content of 8%, which were much larger than the specific surface area (42.3 $m^2/g$) and the interlamellar spacing (0.61 nm) of the undoped MXene. At a current density of 100 mA/g, a reversible capacity of the selenium-doped MXene as an electrode material shown in FIG. 6 after 100 cycles was 298.1 mAh/g, which was 3.29 times that of the undoped MXene as an electrode (90.7 mAh/g).

Embodiment 4

A preparation method of a selenium-doped MXene composite nano-material, comprised the following steps:
(1) 400 mg MXene material ($V_2CT_x$) and 1000 mg organic selenium source (800 mg phenylselenol, 100 mg dimethyl selenide and 100 mg dibenzyl diselenide) were added into ethanol to prepare 40 mg/ml dispersion, and the dispersion was magnetically stirred at a room temperature for 3 h;
(2) the dispersion obtained in the step (1) was transferred into a 50 ml reaction kettle, placed in an oven to react at 140° C. for 10 h, and naturally cooled to a room temperature;
(3) the product obtained in the step (2) was collected, thoroughly cleaned with deionized water and anhydrous ethanol, and centrifuged, and then dried under vacuum at 60° C. for 6 h;
(4) the sample obtained in the step (3) was placed into a tubular furnace for calcination, introduced with Ar gas at a gas flow speed of 200 ml/min, and a temperature rise rate of 5° C./min, further calcined at 300° C. for 2 h, and then naturally cooled to a room temperature to obtain the selenium-doped MXene composite nano-material; and
(5) the selenium-doped MXene composite nano-material obtained in the step (4) was mixed with a polyvinylidene fluoride binder and carbon black according to a mass ratio of 8:1:1, a proper amount of N-methyl pyrrolidone solution was added, stirred and dispersed, a slurry was formed after uniformly stirring and was coated on a current collector, and dried under vacuum and sliced as an electrode material.

At a current density of 100 mA/g, a reversible capacity of the selenium-doped MXene as a cathode material of a potassium ion battery in this embodiment after 100 cycles was 370 mAh/g, which was 4.08 times that of the undoped MXene as an electrode (90.7 mAh/g), and the doped MXene material in this embodiment had a very stable charge-discharge cycle characteristic.

Embodiment 5

A preparation method of a selenium-doped MXene composite nano-material, comprised the following steps:
(1) 600 mg MXene material (500 mg $Ti_2CT_x$ and 100 mg $Mo_2CT_x$) and 1000 mg phenylselenol were added into ethanol to prepare 60 mg/ml dispersion, and the dispersion was magnetically stirred at a room temperature for 3 h;
(2) the dispersion obtained in the step (1) was transferred into a 50 ml reaction kettle, placed in an oven to react at 170° C. for 13 h, and naturally cooled to a room temperature;
(3) the product obtained in the step (2) was collected, thoroughly cleaned with deionized water and anhydrous ethanol, and centrifuged, and then dried under vacuum at 60° C. for 6 h;
(4) the sample obtained in the step (3) was placed into a tubular furnace for calcination, introduced with Ar gas at a gas flow speed of 240 ml/min, and a temperature rise rate of 5° C./min, further calcined at 300° C. for 2 h, and then naturally cooled to a room temperature to obtain the selenium-doped MXene composite nano-material; and (5) the selenium-doped MXene composite nano-material obtained in the step (4) was mixed with a polyvinylidene fluoride binder and carbon black according to a mass ratio of 8:1:1, a proper amount of N-methyl pyrrolidone solution was added, stirred and dispersed, a slurry was formed after uniformly stirring and was coated on a current collector, and dried under vacuum and sliced as an electrode material.

At a current density of 100 mA/g, a reversible capacity of the selenium-doped MXene as a cathode material of a potassium ion battery in this embodiment after 100 cycles was 357 mAh/g, which was 3.9 times that of the undoped MXene as an electrode (90.7 mAh/g), and the doped MXene material in this embodiment had a very stable charge-discharge cycle characteristic.

Comparative Example 1: undoped MXene is used as a cathode of a potassium ion battery.

Comparative Example 2: an inorganic selenium source (e.g., selenium powder)-doped MXene is used as a cathode of a potassium ion battery, wherein a doping process is the same as that in the Embodiment 2.

TABLE 1

Performance test

|  |  | Specific surface area ($m^2/g$) | Interlamellar spacing (nm) | Mass fraction of selenium atom content (%) | Stable capacity after 100 cycles (mAh/g) |
|---|---|---|---|---|---|
| Comparative Example 1 | Undoped MXene | 42.3 | 0.61 | 0 | 90.7 |
| Embodiment 1 | Selenium-doped MXene | 185.7 | 0.73 | 3 | 220.5 |
| Comparative Example 2 | Inorganic selenium source-doped MXene | 136.1 | 0.63 | 1 | 160 |
| Embodiment 2 | Selenium-doped MXene | 326.2 | 0.77 | 6 | 321 |
| Embodiment 3 | Selenium-doped MXene | 283.9 | 0.76 | 8 | 298.1 |
| Embodiment 4 | Selenium-doped MXene | 378.4 | 0.75 | 5 | 370 |
| Embodiment 5 | Selenium-doped MXene | 360.2 | 0.76 | 7 | 357 |

The foregoing descriptions are merely specific embodiments of the present invention, but are not intended to limit the protection scope of the present invention. All equivalent transformations made using the description of the invention, or being used directly or indirectly in other related technical fields, are similarly included in the protection scope of the present invention.

What is claimed is:

1. A method of preparing a selenium-doped MXene composite nano-material, comprising:
   (1) adding a MXene and an organic selenium source into a dispersant, and stirring to prepare a dispersion with a concentration of 1 mg/ml to 100 mg/ml, wherein a mass ratio of the MXene to the organic selenium source is 1:1 to 10, wherein the dispersion concentration is the concentration of the MXene and the organic selenium source;
   (2) transferring the dispersion into a reaction kettle, then heating to 100° C. to 220° C., reacting for 10 h to 30 h, and then naturally cooling to a room temperature to form a product;
   (3) washing the product obtained in the step (2) with a cleaning agent, centrifuging to collect a precipitate, and drying the precipitate under vacuum for 6 h to 20 h; and
   (4) placing the precipitate obtained in the step (3) into a tubular furnace for calcination, introducing protective gas, heating to 300° C. to 1000° C. for 2 h to 8 h, and then naturally cooling to a room temperature to obtain the selenium-doped MXene composite nano-material.

2. The method of claim 1, wherein the organic selenium source is at least one selected from the group consisting of phenylselenol, dimethyl selenide and dibenzyl diselenide.

3. The method of claim 1, wherein the MXene is one or more selected from the group consisting of $Ti_2NT_x$, $Mo_2NT_x$, $V_2NT_x$, $Ti_2CT_x$, $Mo_2CT_x$ and $V_2CT_x$.

4. The method of claim 1, wherein the dispersant is at least one selected from the group consisting of N,N-dimethylformamide and ethanol.

5. The method of claim 1, wherein the cleaning agent is at least one selected from the group consisting of water and ethanol.

6. The method of claim 1, wherein a selenium doping amount in the selenium-doped MXene composite nano-material is 3 wt % to 8 wt %.

7. The method of claim 1, wherein a stirring time in the step (1) is 1 h to 5 h.

8. The method of claim 1, wherein the dispersion is heated to 110° C. to 200° C. after being transferred into the reaction kettle, and reacted for 12 h to 20 h in the step (2).

9. The method of claim 1, wherein a rotation speed used for the centrifugation in the step (3) is 4000 rpm to 6000 rpm.

10. The method of claim 1, wherein a temperature of drying under vacuum is 50° C. to 70° C., and a vacuum degree does not exceed 133 Pa.

11. The method of claim 1, wherein the temperature is heated to 300° C. to 1000° C. with a heating speed of 3° C/min to 7° C/min in the step (4).

12. The method of claim 1, wherein the protective gas is $N_2$ or Ar, and a gas flow speed is 180 ml/min to 300 ml/min.

* * * * *